(12) United States Patent
Chang (10) Patent No.: US 8,982,139 B2
(45) Date of Patent: Mar. 17, 2015

(54) IMAGE REFRESHING METHOD AND ASSOCIATED IMAGE PROCESSING APPARATUS

(75) Inventor: Chih-Hao Chang, Hsinchu County (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 344 days.

(21) Appl. No.: 13/593,767

(22) Filed: Aug. 24, 2012

(65) Prior Publication Data

US 2013/0050179 A1 Feb. 28, 2013

(30) Foreign Application Priority Data

Aug. 25, 2011 (TW) .............................. 100130574 A (51) Int. Cl.
*G09G 5/39* (2006.01)
*G06T 1/60* (2006.01)
*H04N 7/00* (2011.01)

(52) U.S. Cl.
CPC ....................................... *H04N 7/00* (2013.01)
USPC ........................................... 345/531; 345/530

(58) Field of Classification Search
CPC .......................... G06T 1/60; G09G 5/36–5/366
USPC ........................................... 345/530, 531, 545
See application file for complete search history.

(56) References Cited

U.S. PATENT DOCUMENTS 7,868,890 B2 * 1/2011 Ludwin et al. ................. 345/502
2006/0007200 A1 * 1/2006 Young et al. ................... 345/204

* cited by examiner

*Primary Examiner* — Jacinta M Crawford
(74) *Attorney, Agent, or Firm* — WPAT, PC; Justin King (57) ABSTRACT

An image refreshing method applied to an image processing apparatus is provided for preventing tearing effect during frame refresh. The method includes steps of: determining a location of an updating part of a frame; determining a refresh starting location of the frame on a panel of the image processing apparatus according to the location of the updating part; and writing the updating part to refresh the frame.

16 Claims, 9 Drawing Sheets

IMAGE REFRESHING METHOD AND ASSOCIATED IMAGE PROCESSING APPARATUS

This application claims the benefit of Taiwan application Serial No. 100130574, filed Aug. 25, 2011, the subject matter of which is incorporated herein by reference.

BACKGROUND OF THE INVENTION

1. Field of the Invention

The invention relates in general to an image refreshing method and associated image processing apparatus, and more particularly, to an image refreshing method and associated image processing apparatus capable of determining a refresh starting location or sequence of a frame on a panel according to a location of an updating part of the frame.

2. Description of the Related Art

In a conventional image processing apparatus, a complete process to display a frame on a panel includes writing the frame into a storage device, reading the frame from the storage device and displaying the frame on the panel. Writing the frame into the storage device is also referred to as "updating the frame in the storage device", and displaying the frame on the panel is also referred to as "refreshing the frame on the panel". Theoretically, reading and refreshing the frame shall be performed nearly synchronously. However, an operation unit for writing the frame into the storage device and an operation unit for reading the frame from the storage device are usually unsynchronized. Moreover, a writing speed for writing the frame into the storage device and a reading speed for reading the frame from the storage device are different and do not necessarily cooperate with each other. In general, the panel successively displays a plurality of frames, meaning that the image processing device needs to consecutively write and read different frames in an uninterrupted manner. In an event that a relation between writing frames into the storage device and reading frames from the storage device is not appropriately adjusted and maintained, e.g., a frame is being written into the storage device while another frame is being read from the storage device, a new frame and an old frame may occasionally overlap to show an incomplete image on the panel—such an effect is called a tearing effect.

Figure 1A:
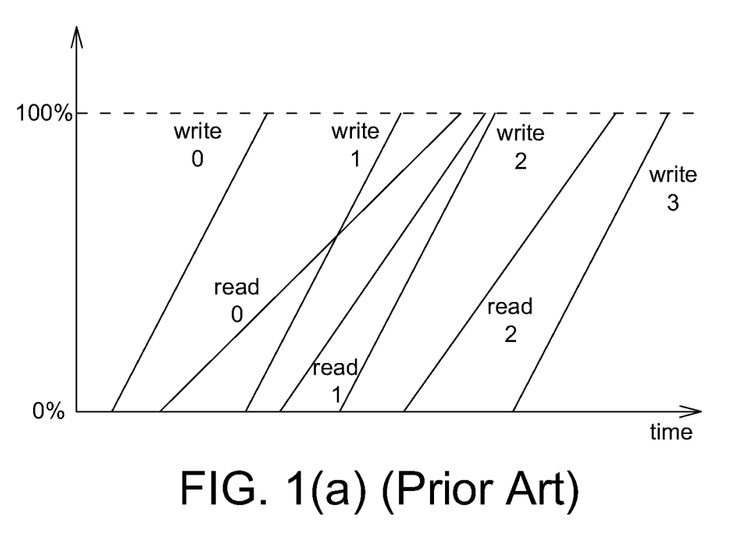
FIG. 1(a) is a schematic diagram of a tearing effect caused in a conventional image processing apparatus.
Figure 1B:
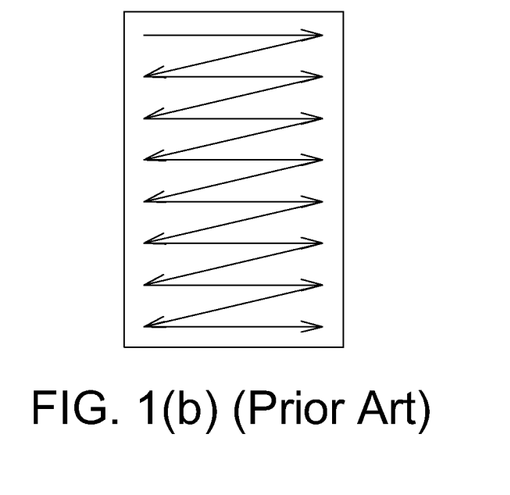
FIGS. 1(b) and 1(c) are schematic diagrams of operations of a conventional image processing apparatus refreshing a frame on a panel.
Figure 1C:
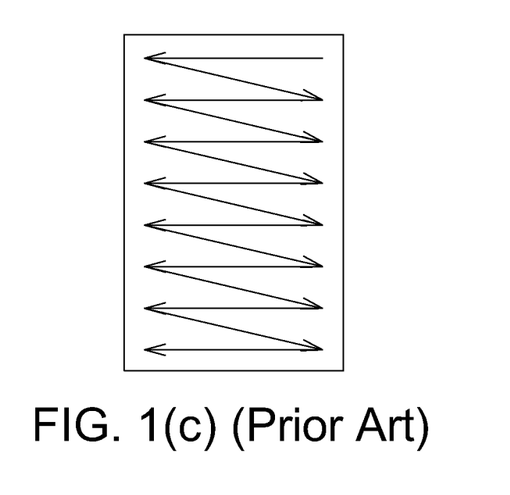

FIG. 1(a) shows a schematic diagram of a tearing effect caused by a conventional image processing apparatus. In the diagram, "write 0" means writing a frame 0 into a storage device, and "read 0" means reading the frame 0 from the storage device. Similarly, "write 1" means writing a frame 1 into the storage device, and "read 1" means reading the frame 1 from the storage device. As shown in FIG. 1(a), "read 1" and "write 2" do not intersect, indicating that "read 1" and "write 2" do not interfere each other. However, "read 0" and "write 1" do intersect, indicating operations of reading the frame 0 and writing the frame 1 at some point are performed simultaneously to possibly lead to a tearing effect on the panel. Furthermore, Y-axis scales in FIG. 1(a) also correspond to different locations in the frame and are directional. For example, when "read 0%" is defined corresponding to an upper-left corner of a frame and "read 100%" is defined corresponding to a lower-right corner of the frame, the frame is read from data of the upper-left corner to data of the lower-right corner. That is to say, when refreshing the frame, the frame is refreshed from the upper-left corner to the lower-right corner of the panel, as shown in FIG. 1(b). Thus, the intersection formed by "read 0" and "write 1" means that reading the frame 0 from the storage device and writing the frame 1 into the storage device are at a certain point simultaneously performed at a same location of the storage device, resulting in the tearing effect. Similarly, FIG. 1(c) shows a frame being refreshed from the upper-right corner to the lower-left corner.

Figure 2:
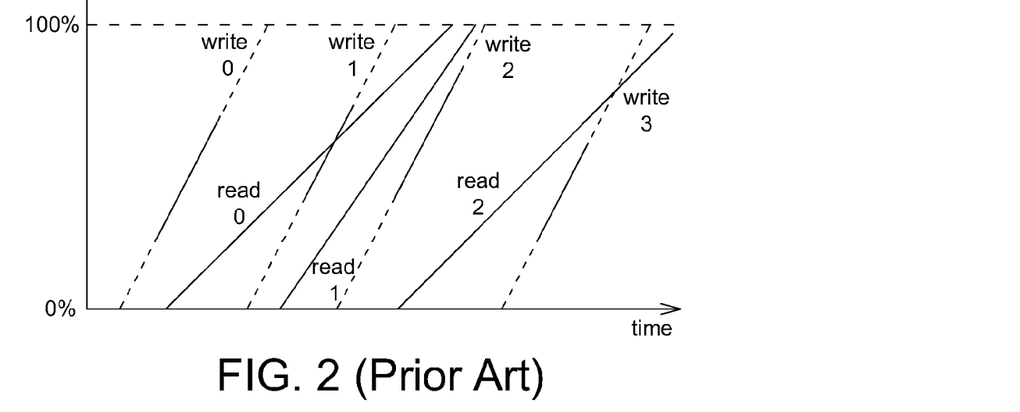
FIG. 2 is a schematic diagram of a partial update of a frame.
Figure 3:
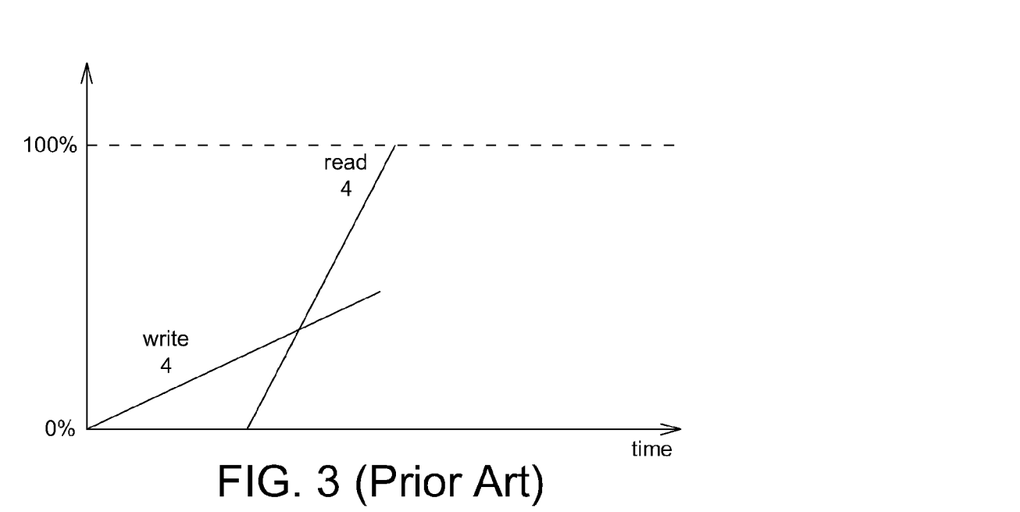
FIG. 3 is a schematic diagram of a tearing effect caused by a slow writing speed of a same frame.

A "partial refresh" may be performed when refreshing a frame. When the majorities of images of two adjacent frames are identical, that is, only small parts of the images are different, the partial refresh is performed. At this point, only data of a part of the frame, instead of data of the entire frame, needs to be written, i.e., only an updating part of the frame being written is written. Taking FIG. 2 for example, dotted lines of "write 0 to 3" denote non-updating parts, whereas solid lines denote updating parts. Therefore, the tearing effect does not occur if "read 0 to 2" and "write 0 to 3" intersect at the dotted lines, e.g., "read 2" and "write 3". In contrast, the tearing effect nevertheless occurs if the intersection takes places at the solid lines, e.g., "read 0" and "write 1". It should be noted that, the tearing effect takes place not only when a previous frame is read too slowly (e.g., "read 0" in FIG. 1 and FIG. 2 is read too slowly, and thus intersects "write 1" of a next frame) but also when a same frame is written too slowly. For example, "write 4" in FIG. 3 is written too slowly and thus intersects "read 4" to lead to the tearing effect.

Therefore, there is a need for a mechanism that provides a solution for preventing the issue of tearing effect during frame refresh.

SUMMARY OF THE INVENTION

The invention is directed to an image refreshing method and associated image processing apparatus for preventing the tearing effect during frame refresh.

According to an embodiment the present invention, an image refreshing method adapted to an image processing apparatus is provided. The processing apparatus includes a panel. The method includes steps of: determining a location of an updating part of a frame; and determining a refresh starting location of the frame on the panel according to the location of the updating part.

According to another embodiment the present invention, an image refreshing method adapted to an image processing apparatus is provided. The processing apparatus includes a panel. The method includes steps of: determining a location of an updating part of a frame; and determining a refresh sequence of the frame on the panel according to the location of the updating part.

According to yet another embodiment the present invention, an image processing apparatus is provided. The image processing apparatus includes: a panel; a processor, for determining a location of an updating part of a frame, and determining a refresh starting location of the frame on the panel according to the location of the updating part; and a refreshing module, for refreshing the frame on the panel according to the refresh starting location.

With the above embodiments, updating parts of a frame during reading/writing operations can be staggered to effectively reduce the probability of the tearing effect.

The above and other aspects of the invention will become better understood with regard to the following detailed description of the preferred but non-limiting embodiments. The following description is made with reference to the accompanying drawings.

DETAILED DESCRIPTION OF THE INVENTION

Throughout the specification and the appended claims, certain terms are utilized for referring to specific elements. A person having ordinary skill in the art can easily appreciate that different terms may be used by hardware manufacturers for referring to a same element. Differences in terms in the specification and the appended claims are not to be construed for distinguishing the elements, and the elements are differentiated based on functional differences. Throughout the specification and the appended claims, the term "comprise" is regarded as an open-end term to be explained as "include but not limited to". Further, the term "couple" includes any means of direct and indirect electrical connections. Therefore, if it is described that a first device is coupled to a second device, it means that the first device may be electrically connected to the second device in a direct manner, or in an indirectly manner through other devices and connection means.

Figure 4:
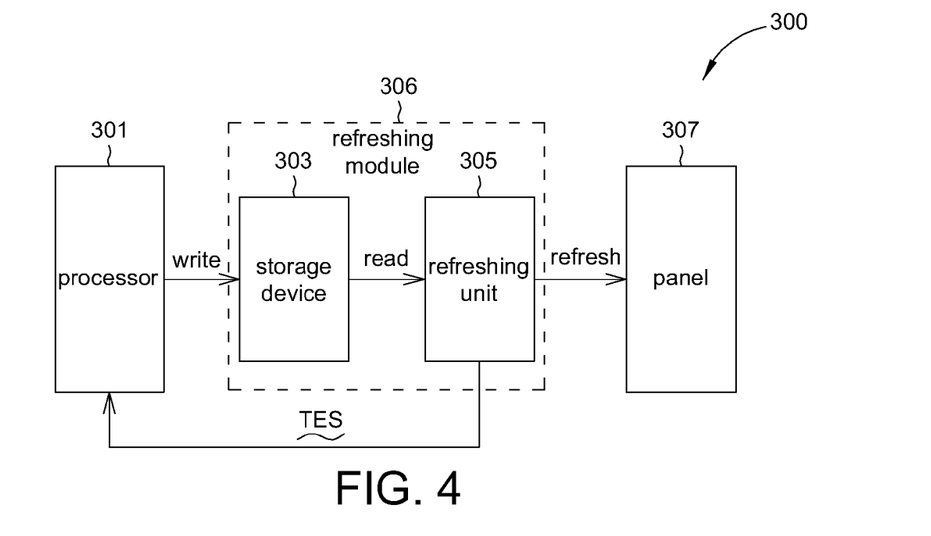
FIG. 4 is a block diagram of an image processing apparatus implementing an image refreshing method according to an embodiment of the present invention.

FIG. 4 shows a block diagram of an image processing apparatus 300 for implementing an image refreshing method according to an embodiment of the present invention. It should be noted that, in addition to being implemented by the image processing apparatus 300, the image refreshing method according to the embodiment of the present invention is applicable to an image processing apparatus 300 in other structures. Referring to FIG. 4, the image processing apparatus 300 includes a processor 301, a storage device 303, a refreshing unit 305, and a panel 307. The processor 301 controls writing of a frame (e.g., "write 0", "write 1" . . . in FIG. 1) into the storage device. After the storage device 303 reads the frame (e.g., "read 0", "read 1" . . . in FIG. 1), the refreshing unit 305 refreshes the frame to the panel 307 to display the latest frame. The refreshing unit 305 may further transmit a tearing effect control signal TES to the processor 301 to prevent the tearing effect. Details of the tearing effect control signal TES will be described later. The storage device 303 and the refreshing unit 305 may be regarded as a refreshing module 306, for receiving a written frame and refreshing the frame to the panel 307.

Figure 5:
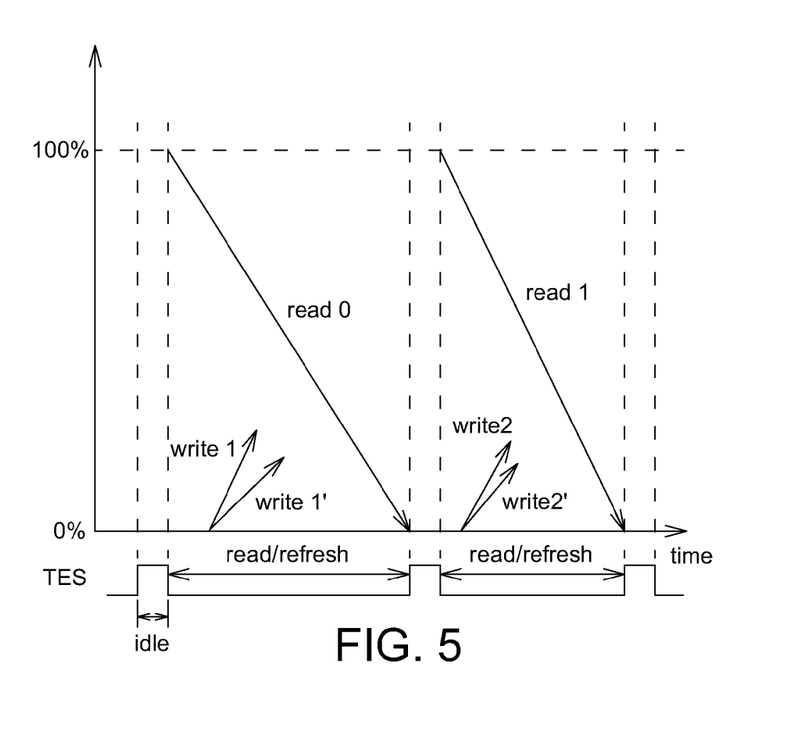
FIGS. 5 to 8 are schematic diagrams of an image refreshing method according to an embodiment of the present invention.

FIGS. 5 to 8 show schematic diagrams of an image refreshing method according to an embodiment of the present invention. A main difference between FIG. 5 and FIG. 1 is that, reading lines (i.e., refreshing lines) "read 0, 1, 2" and writing lines "write 0, 1, 2, 3" in FIG. 1 have a same starting location (0%). That is, in the conventional solution, writing and reading/refreshing of frames can only start from the same location of the frame (e.g., in FIG. 1, from the upper-left corner of the frame). However in the embodiment in FIG. 5, starting locations of the writing lines and reading lines are different. For example, the writing lines "write 1, 1', 2, 2'" all start from 0%, whereas the reading lines "read 0 and 1" start from 100%. That is, the start/end points of writing operations of the frame and the start/end points of the reading/refreshing operations of the frame are opposite, and the reading/refreshing sequence of the frame is also changed. The essence of the present invention is to flexibly adjust the start/end points and sequences of the reading/refreshing operations through an appropriate determining mechanism, so as to reduce the probability of simultaneous writing and reading of a same position to further prevent the tearing effect. Such a mechanism is capable of preventing the tearing effect, especially the tearing effect caused by a slow writing speed.

Figure 6:
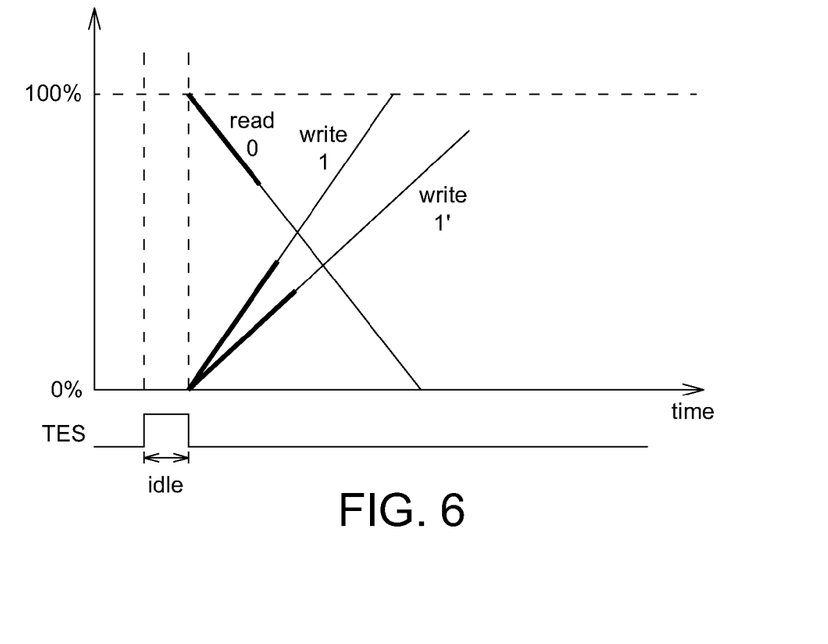
Figure 7:
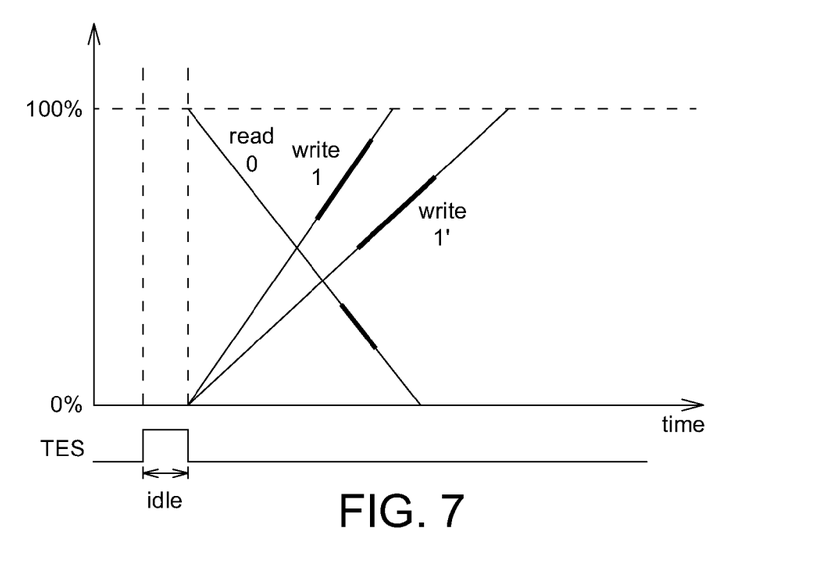
Figure 8:
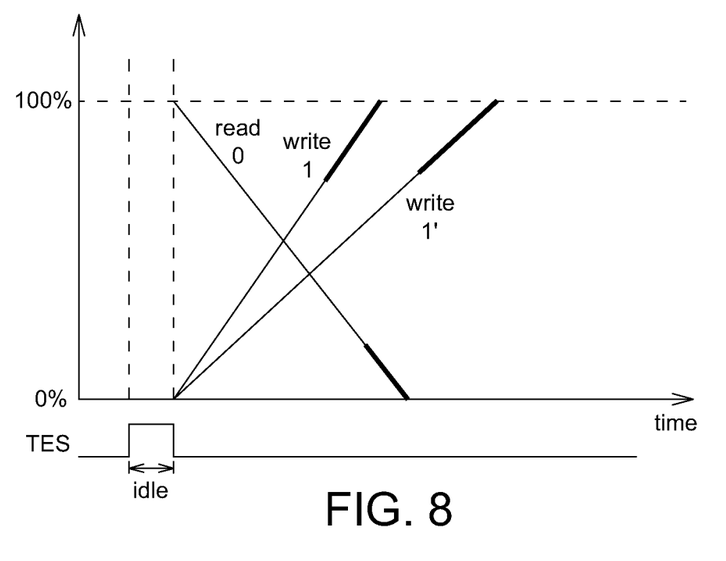

Details of the above mechanism for preventing the tearing effect shall be given by taking the writing lines "write 1" and "write 1'" and the reading line "read 0" as an example. "Write 1" and "write 1'" represent a same writing operation starting at a same time point, with the speed of "write 1'" being slower than that of "write 1". Similarly, "write 2" and "write 2'" in FIG. 5 represent a same writing operation starting at a same time point, with the speed of "write 2'" being slower than "write 2". In FIGS. 6 to 8, thick lines denote data being processed, either by writing or reading, within a same period of time. It should be noted that, FIGS. 6 to 8 depict situations of a partial update; that is to say, only data corresponding to the thick lines are written. As shown in FIG. 6, during an initial period of the writing and reading/refreshing operations, the writing and reading/refreshing operations are performed from opposite locations. More specifically, "write 1" and "write 1'" start from the location corresponding to 0%, and the reading/refreshing operation is performed from the location corresponding to 100%, and so the tearing effect is not an issue. Referring to FIG. 7, different from FIG. 5, only after "read 0" finishes reading frame data around the location corresponding to 50%, "write 1" and "write 1'" then write data at the same location, and so the tearing effect can be avoided. Similarly, as shown in FIG. 8, close to the end of the writing and reading/refreshing, "read 0" reads the frame data at the location corresponding to 0%, and "write 1'" and "write 1" write the frame data at the location corresponding to 100%, and so the tearing effect can also be avoided.

It is seen from the descriptions associated with FIGS. 6 and 8 that, by staggering the writing locations through changing the starting location or sequence of the read/refreshing operation, the occurrence of tearing effect can be reduced in a situation of a partial update. Furthermore, the tearing effect is prevented even when the writing speed is slow, as "write 1'". Therefore, the occurrence of tearing effect can be further reduced through changing the starting location or sequence of the reading/refreshing according to the location of the updating part.

Figure 9A:
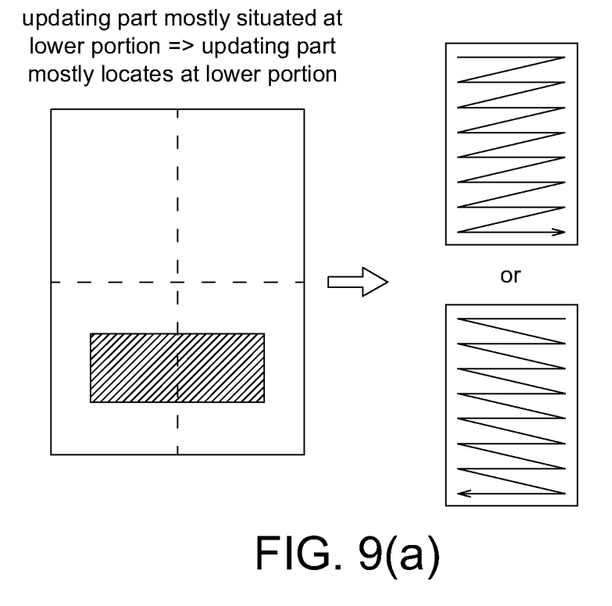
FIGS. 9(a), 9(b), 10(a), and 10(b) are schematic diagrams of different refresh starting locations or sequences adopted corresponding to updating parts situated at different locations.

FIGS. 9(a), 9(b), 10(a), and 10(b) are schematic diagrams of adopting different refresh starting locations or sequences in response to updating parts of different locations. In a common situation of a partial update, the updating part may include a main updating part and a plurality of secondary updating parts. A criterion for distinguishing a main updating part from a secondary part may depends on that the part occupying a greater area is the main updating part. In descriptions below, an example of changing the reading/refresh starting location or sequence in response to the main updating part is given. Referring to FIG. 9(a), the main updating part locates at a lower portion, and so the reading/refreshing may start from the upper-left corner to end at the lower-right corner. Alternatively, the reading/refreshing may start from the upper-right corner to end at the lower-left corner. Referring to FIG.

Figure 9B:
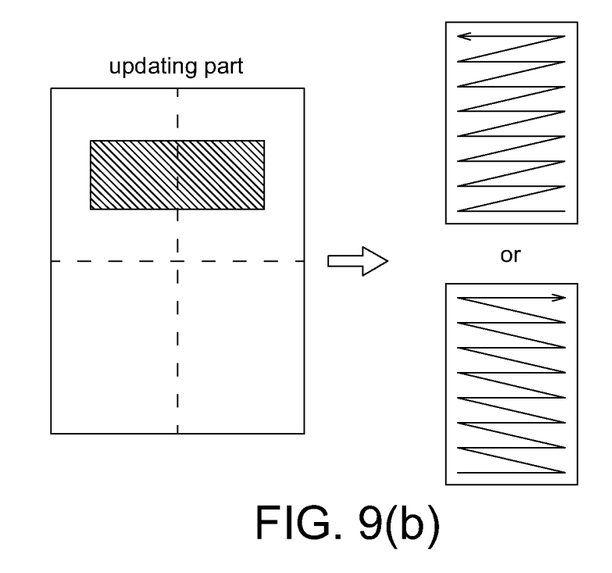
Figure 10A:
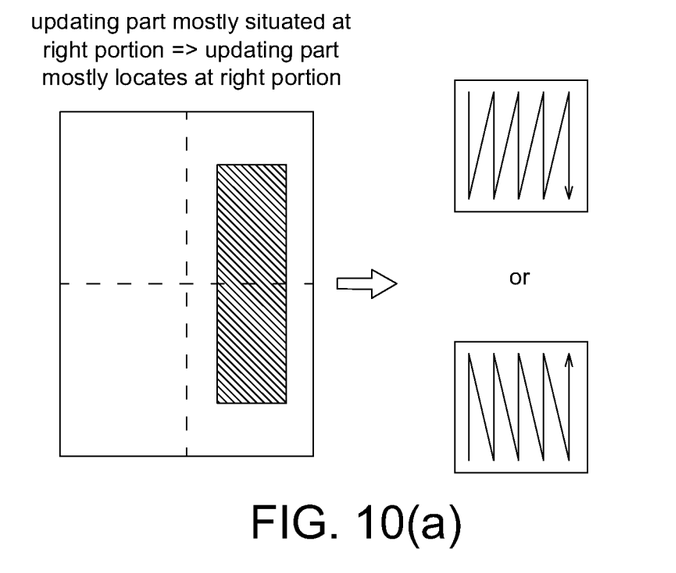
Figure 10B:
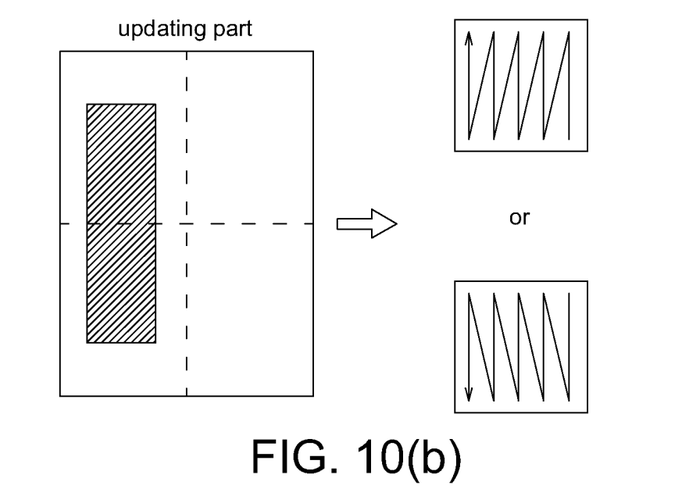

9(b), the main updating part locates at an upper portion, and so the reading/refreshing may start from the lower-right corner to end at the upper-left corner. Alternatively, the reading/refreshing may start from the lower-left corner to end at the upper-right corner. Referring to FIG. 10(a), the main updating part locates at the right portion, and so the reading/refreshing may start from the upper-left corner to end at the lower-right corner. Alternatively, the reading/refreshing may start from the lower-left corner to end at the upper-right corner. Referring to FIG. 10(b), the main updating part locates at the left portion, and so the reading/refreshing may start from the lower-right corner to end at the upper-left corner. Alternatively, the reading/refreshing may start from the upper-right corner to end at the lower-left corner.

It is seen from FIGS. 9(a), 9(b), 10(a), and 10(b) that, in order to stagger the updating parts to prevent the tearing effect, two parameters in the reading/refreshing can be adjusted—the starting location and the sequence. When the starting location is far enough from the main updating part, the tearing effect can be prevented regardless of the reading/refreshing sequence. However, limited by the area of the main updating part in certain circumstances, it is possible that the reading/updating sequence cannot be adjusted to prevent the tearing effect due to insufficient distance between the starting location and the main updating part. Alternatively, the two parameters may be combined to achieve better efficiency. As long as the tearing effect does not occur when the frame is displayed, the reading/refresh starting location and sequence can be selected arbitrarily according to the location of the main updating part.

More specifically, a starting location in any of the four corners, i.e., an upper-left corner, an upper-right corner, a lower-left corner, and a lower-right corner of a frame, can be selected as candidate refresh starting locations. By comparing distances between the four corners to the main updating part, at least one corner having the longest distance from the main updating part is selected as a refresh starting location. Referring to FIG. 9(a), the main updating part locates at the lower portion, and the upper-left corner and the upper-right corner have the longest distance from the main updating part. Accordingly, one of the upper-left and upper-right corners is selected as the starting location. On the other hand, the reading/refreshing sequence may also be determined based on the above distances. More specifically, one of the corners with the longest distance is selected as the starting location, and the reading/refreshing is performed in a sequence from the selected corner towards the other corner with the longest distance to end at a corner with a closer distance. Again referring to FIG. 9(a), the main updating part locates at the lower portion, and the upper-left and upper-right corners have a longest distance from the main updating part. Thus, the reading/refreshing can be performed from the upper-left corner starting location towards the upper-right corner to end at the lower-right corner. It should be noted that, if only one corner with the longest distance is available, the corner can be utilized as the start position for performing the reading/refreshing. The reading/refreshing is performed in a sequence from the corner with the longest distance starting location towards a corner with a second farthest distance to end at a corner with a closer distance.

The above embodiment may be implemented in cooperation with the tearing effect control signal TES in FIG. 4 to provide an enhanced efficiency. Again referring to FIGS. 4 and 5, the tearing effect control signal TES has a high-level part and a low-level part. The low-level part represents a status in which the refreshing unit 305 in FIG. 4 performs the reading/refreshing. The high-level part represents a status in which the refreshing unit 305 in FIG. 4 is in an idle state rather than performing the reading/refreshing operation. Thus, through the tearing effect control signal TES, the timing of the reading/refreshing can be known, so as to stagger starting time points of the writing and the reading/refreshing, as shown in FIG. 5, thereby further reducing the occurrence of tearing effect.

Figure 11:
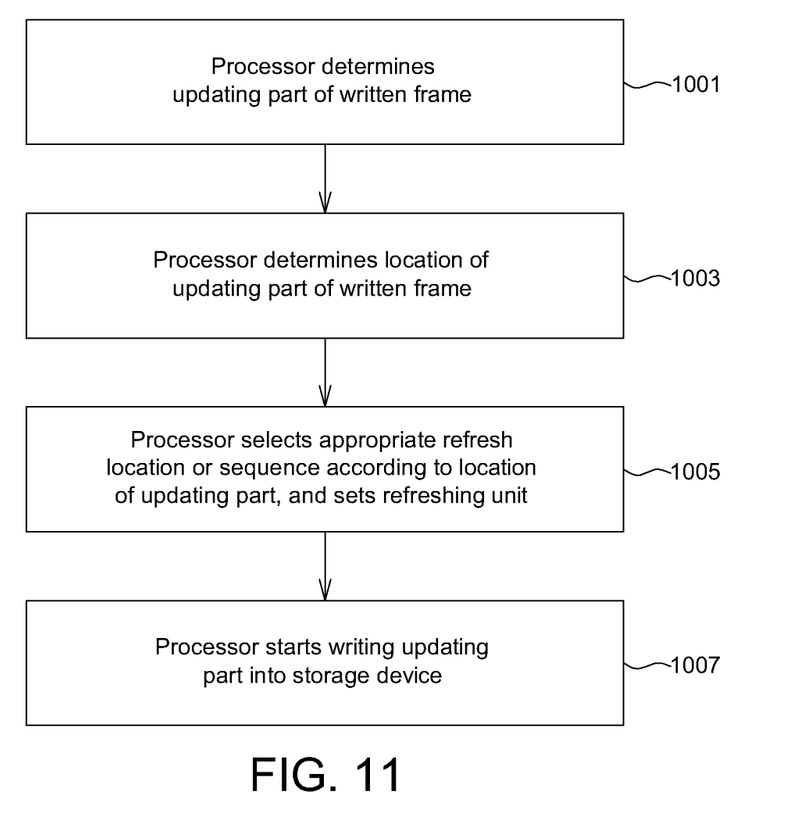
FIG. 11 is a flowchart of an image refreshing method according to an embodiment of the present invention.

FIG. 11 shows a flowchart of an image refreshing method according to an embodiment of the present invention. Details are given below with reference to FIGS. 4 and 11. It should be noted that, the steps in FIG. 11 are for explaining the present invention in coordination of the apparatus in FIG. 4, and are not to be construed as limiting the present invention thereto.

The image refreshing method according to the embodiment of the present invention includes the following steps. In Step 1001, the processor determines an updating part in a written frame. In Step 1003, the processor determines a location of the updating part in the written frame. In Step 1005, the processor selects an appropriate refresh starting location or sequence according to the location of the updating part, and sets the refreshing unit 305. In Step 1007, the processor 301 starts writing the updating part into the storage device. Details of the steps can be referred from related descriptions above, and shall be omitted herein for the sake of brevity.

Therefore, according to the above embodiments, the occurrence of tearing effect is effectively reduced through staggering updating parts of a frame in a reading/refreshing.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image refreshing method, adapted to an image processing apparatus comprising a panel, the method comprising:
   determining a location of an updating part in a frame; and
   determining a refresh starting location of the frame on the panel according to the location of the updating part;
   wherein the updating part comprises a main updating part and a plurality of secondary updating parts, the frame comprises a plurality of corners, and the step of determining a refresh starting location of the frame on the panel further comprises:
   comparing distances between the plurality of corners and the main updating part to determine at least one corner with a farthest distance; and
   selecting one corner with the longest distance as the refresh starting location.

2. The method according to claim 1, the image processing apparatus further comprising a storage device and a refreshing unit, the method further comprising:
   writing the updating part into the storage device to update the updating part of the frame; and
   reading the frame to the refreshing unit, and refreshing the frame on the panel according to the refresh starting location.

3. The method according to claim 2, wherein a starting time point of writing the updating part into the storage device is different from a starting time point of refreshing the frame on the panel.

4. The method according to claim 1, wherein the step of determining a refresh starting location of the frame on the panel further comprises:

determining a refresh sequence on the panel according to the location of the updating part.

5. The method according to claim 4, wherein the step of determining a refresh sequence on the panel further comprises:
comparing distances between the plurality of corners and the main updating part to determine at least one corner with a longest distance and at least one corner with a shorter distance; and
selecting one corner with the longest distance as the refresh starting location, and selecting reading/refreshing from the refresh starting location towards another corner situated at the longest distance and ending at one corner situated with the shorter distance as the refresh sequence.

6. The method according to claim 4, wherein the step of determining a refresh sequence on the panel further comprises:
comparing distances between the corners and the main updating part to determine a corner with a longest distance, a corner with a second longest distance and at least one corner with a shorter distance; and
selecting the corner with the longest distance as the refresh starting location, and selecting reading/refreshing starting from the refresh starting location towards the corner situated at the second longest distance and ending at one corner situated at the shorter distance as the refresh sequence.

7. An image refreshing method, adapted to an image processing apparatus comprising a panel, the method comprising:
determining a location of an updating part in a frame; and
determining a refresh sequence of the frame on the panel according to the location of the updating part;
wherein the updating part comprises a main updating part and a plurality of secondary updating parts, the frame comprises a plurality of corners, and the step of determining a refresh sequence of the frame on the panel further comprises:
comparing distances between the corners and the main updating part to determine at least one corner with a longest distance and at least one corner with a shortest distance; and
selecting one corner with the longest distance as the refresh starting location, and selecting reading/refreshing from the refresh starting location towards another corner with the longest distance and ending at one corner with the shorter distance as the refresh sequence.

8. The method according to claim 7, the image processing apparatus further comprising a storage device and a refreshing unit, the method further comprising:
writing the updating part into the storage device to update the updating part of the frame; and
reading the frame by the refreshing unit, and refreshing the frame on the panel according to the refresh sequence.

9. The method according to claim 8, wherein a starting time point of writing the updating part into the storage device is different from a starting time point of refreshing the frame to the panel.

10. The method according to claim 7, wherein the updating part comprises a main updating part and a plurality of secondary updating parts, the frame comprises a plurality of corners, and the step of determining a refresh sequence of the frame on the panel further comprises:
comparing distances between the corners and the main updating part to determine a corner with a longest distance, a corner with a second longest distance and at least one corner with a shorter distance; and
selecting the corner with the longest distance as the refresh starting location, and selecting reading/refreshing starting from the refresh starting location towards the corner situated at the second longest distance and ending at one corner situated at the shorter distance as the refresh sequence.

11. An image processing apparatus, comprising:
a panel;
a processor, for determining a location of an updating part in a frame, and determining a refresh starting location of the frame on the panel according to the location of the updating part; and
a refreshing module, for refreshing the frame on the panel according to the refresh starting location;
wherein the updating part comprises a main updating part and a plurality of secondary updating parts, the frame comprises a plurality of corners; the processor compares distances between the corners and the main updating part to determine at least one corner with a longest distance, and selects one corner with the longest distance as the refresh starting location.

12. The apparatus according to claim 11, wherein the refresh module comprises a storage device and a refreshing unit; the processor writes the updating part into the storage device to update the updating part of the frame; and the refreshing unit reads the frame and refreshes the frame on the panel according to refresh starting location.

13. The apparatus according to claim 12, wherein the refresh module further transmits a tearing effect control signal; and the processor sets a starting time point of writing the updating part into the storage device to be different from a starting time point of refreshing the frame to the panel according to the tearing effect control signal.

14. The apparatus according to claim 11, wherein the processor further determines a refresh sequence of the frame on the panel according to the location of the updating part.

15. The apparatus according to claim 14, wherein the processor compares respective distances between the corners of the frame and the main updating part to determine at least one corner with a longest distance and at least one corner with a closer distance; and the processor further selects one corner with the longest distance as the refresh starting location, and selects reading/refreshing starting from the refresh starting location towards one other corner with the longest distance and ending at one corner with the shorter distance as the refresh sequence.

16. The apparatus according to claim 14, wherein the processor compares distances between the corners and the main updating part to determine a corner with a longest distance, a corner with a second longest distance and at least one corner with a shorter distance; and the processor further selects the corner with the longest distance as the refresh starting location, and selects reading/refreshing starting from the refresh starting location towards the corner with the second longest distance and ending at one corner with the shorter distance as the refresh sequence.

* * * * *